Figure 1:
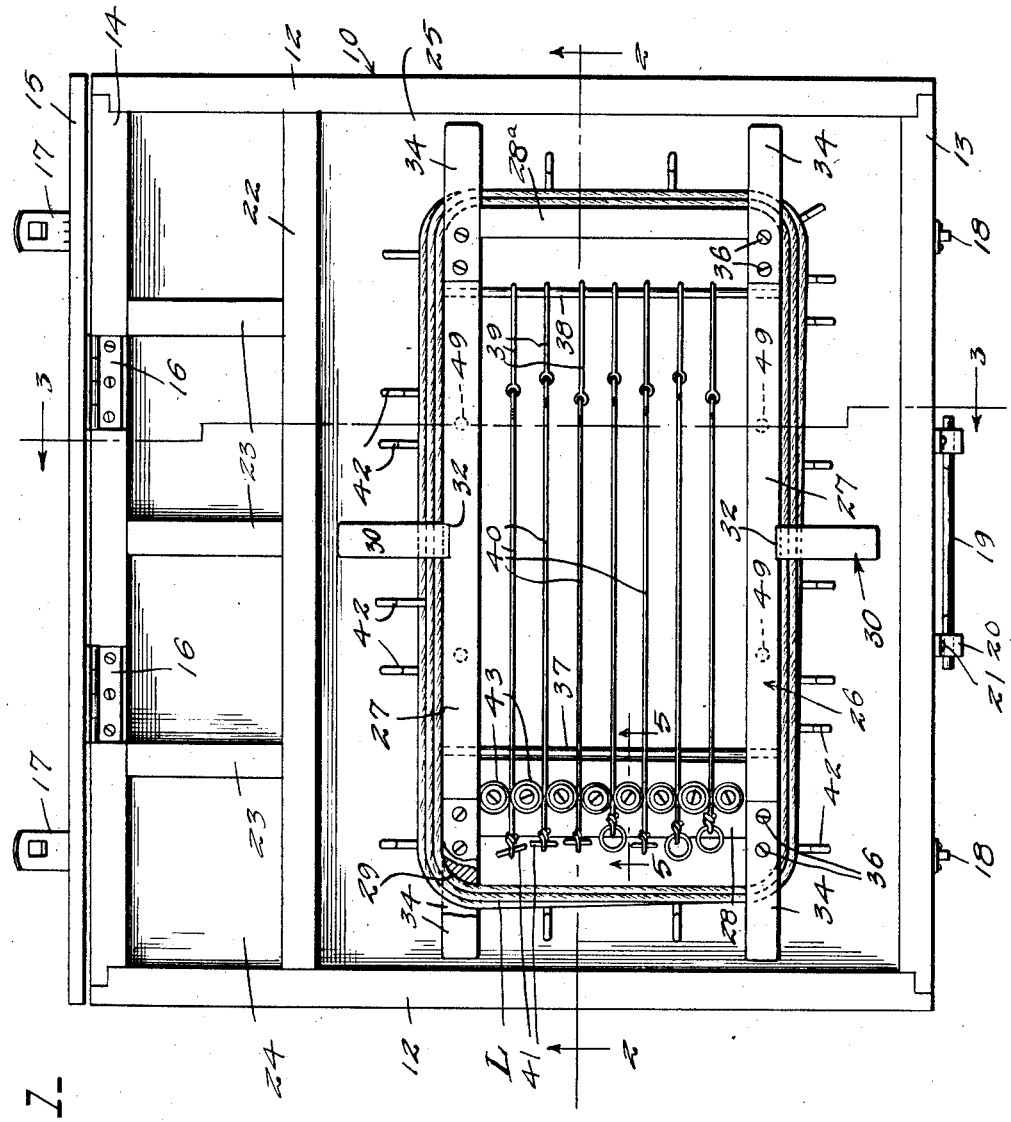

May 26, 1942.    T. M. PARKER    2,284,537
FISHING APPARATUS
Filed Feb. 17, 1941    2 Sheets-Sheet 1

Inventor
T. M. Parker
By Kimmel & Crowell
Attorneys

May 26, 1942. T. M. PARKER 2,284,537
FISHING APPARATUS
Filed Feb. 17, 1941 2 Sheets-Sheet 2
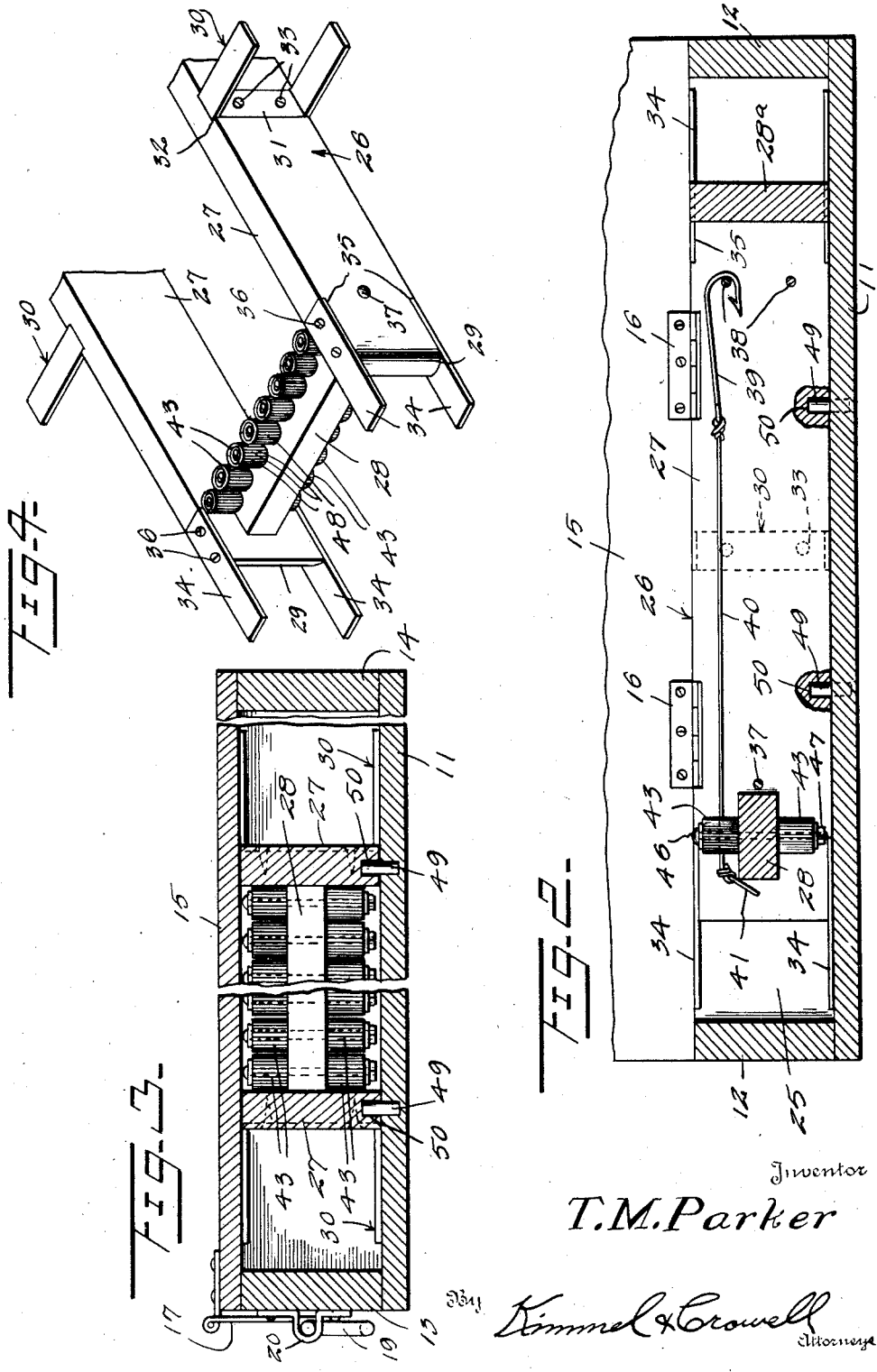
Inventor
T. M. Parker
Kimmel & Crowell
Attorneys Patented May 26, 1942

2,284,537

UNITED STATES PATENT OFFICE 2,284,537

FISHING APPARATUS

Ted M. Parker, Kansas City, Mo.

Application February 17, 1941, Serial No. 379,300

4 Claims. (Cl. 43—31)

This invention relates to fishing apparatus and more particularly to an improved kit and combined line reel and hook holding means.

An object of this invention is to provide an improved casing or box which is provided with suitable compartments for receiving material, such as fish hooks, lines, sinkers, and the like, and which is also provided with a reel holding compartment so constructed as to firmly hold the reel against movement therein.

Another object of this invention is to provide an improved line holding reel embodying means associated with means carried by the casing for the purpose of maintaining the reel against movement in the casing, while at the same time permitting the ready removal or replacement of the reel from the rear compartment.

A further object of this invention is to provide a combination reel and snell, the reel holding the desired length of line in looped form and within the loop formed by the reel a snelling means is provided whereby a relatively large number of hooks may be engaged with the snelling device, the hooks having leaders and attaching means for engagement with attaching means carried by the line.

A still further object of this invention is to provide an improved snelling means which is so constructed that the leaders attached to the hooks will not become entangled and so as to facilitate the placement or removal of the hooks and leaders from the snell.

A further object of this invention is to provide an improved reel structure which is so constructed that when the line is mounted thereupon, the line will be permitted to dry in order that a wet line may be wound upon the reel and then subsequently dried.

To the above objects and to others which may hereinafter appear, the invention consists of the novel construction, combination and arrangement of parts as will be more specifically referred to and illustrated in the accompanying drawings, wherein embodiments of the invention are shown, but it is to be understood that changes, variations and modifications may be resorted to which fall within the scope of the invention as claimed.

Figure 5:
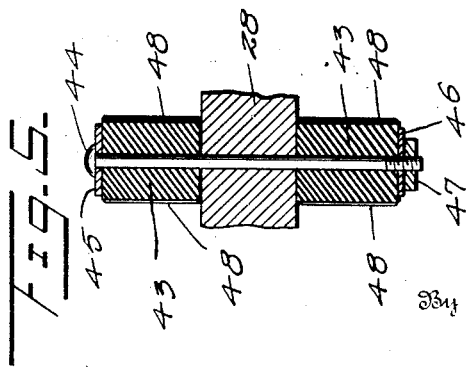

In the drawings:

Figure 1 is a detail top plan of a fishing kit constructed according to an embodiment of this invention, Figure 2 is a sectional view taken on the line 2—2 of Figure 1, Figure 3 is a sectional view taken on the line 3—3 of Figure 1, Figure 4 is a fragmentary perspective view of the reel removed from the kit or casing, and Figure 5 is an enlarged fragmentary sectional view taken on the line 5—5 of Figure 1.

Referring to the drawings, the numeral 10 designates generally a box or casing which comprises a bottom wall 11, end walls 12, a front wall 13 and a rear wall 14. A cover or closure 15 is hingedly secured by means of hinge members 16 to the rear wall 14 and the cover 15 is provided with hasps 17 engageable with keepers 18 provided on the outer side of the front wall 13. A looped handle 19 is swingably mounted in bearing members 20 which are fixed to the front wall 13 between the two keepers 18 by means of fastening members 21. Preferably, the cover 15 is formed in the manner of a flat plate and is adapted to snugly engage on the upper edges of the front, rear and end walls of the receptacle.

A longitudinally extending partition or inner wall 22 extends between the two end walls 12 at a point adjacent the rear of the receptacle and a plurality of parallel partitions 23 are secured at their inner ends to the end wall 14. The partitions 22 and 23 form compartments 24 within which fish hooks or other fishing tackle are adapted to be placed. The partition 22 also divides the interior of the box or receptacle into a relatively large reel holding compartment 25.

A reel structure 26 is adapted to be removably placed in the reel compartment 25 and comprises a pair of parallel side rails or bars 27 and connecting bars or rails 28. The connecting bars 28 are positioned inwardly from the opposite ends of the side bars 27 as shown in Figure 4 so that when the line is mounted about the side members 27 the fishing line L will not contact with the connecting or spacer members 28. Preferably, the opposite ends of the side members 27 are rounded off as at 29 so that no sharp corners will be presented for contact with the line L.

The side members 27 of the reel 26 are provided intermediate their ends with a U-shaped strap 30 which has the bight 31 thereof countersunk as at 32 in the outer side of the strip or side member 27. Fastening members 33 in the form of screws or the like firmly secure the U-shaped member 30 on the side member 27. In the present instance, there is one U-shaped line retaining member 30 on each side member 27 which is positioned in substantially the longitudinal center of a side member 27 as shown in Figure 1.

Each side member 27 is provided at each end thereof with a pair of longitudinally extending straps 34 which are countersunk as at 35 in the adjacent edge of the side member 27 and are secured by screws or fastening devices 36. These straps or line holding members 34 project outwardly of the adjacent end of a side member 27 as clearly shown in Figure 4. The strap members 34 and the U-shaped members 30 form a line holding means between which the fish line L is adapted to engage when wound about the side members 27.

Preferably, the transversely disposed members 28 are provided with a tenon at each end which engages in a mortice provided in the inner face of the side members 27 and the reel 26 is held in assembled condition by means of a pair of elongated bolts 37 and 38. Preferably, one of the transverse members 28a is positioned at right angles to the transverse member 28 and is of a width substantially equal to the width of a side member 27. The transverse member 28 is positioned in substantially the transverse center of the two side members 27 and at a point inwardly from the adjacent ends of these members 27, the purpose for which will be hereinafter described.

If desired and as shown in Figure 1 the transverse member 28a has the outer side thereof substantially flush with the outer curved ends of the two side members 27, whereas the outer edge of the transverse member 28 is positioned inwardly from the adjacent ends of the two side members 27 so as to provide a space or chamber outwardly of the transverse member 28.

In practice there are two of the transverse bolts or bars 38 as shown in Figure 2 which not only hold the adjacent end of the reel in assembled condition, but also serve as a portion of a snell or hook holding means about which hooks 39 are adapted to engage. The hooks 39 may be provided with leaders 40 and also with rings 41 which are adapted to be releasably engaged with snap hooks 42 carried by the line L. The transverse member 28 is provided on the upper and lower faces thereof with cylindrical rubber leader clamping members 43 which are secured to the transverse member 28 by means of a bolt 44 which extends longitudinally through each pair of clamping members 43. Preferably, a washer 45 is interposed between the head of the bolt or screw 44 and the outer side of one of the yieldable clamping members 43 and a second washer 46 is interposed between the nut 47 and the opposite clamping member 43. Each clamping member 43 is provided with longitudinally extending ribs 48 and the clamping members 43 are positioned in substantially contacting relation across the transverse member 28 as shown in Figure 1, so that when a leader 40 is interposed between a pair of clamping members 43, the leader will be yieldably clamped therebetween and in this manner the leader may be pulled longitudinally so as to tighten or stretch the leader with the associated hook engaging over one of the hook holding bolts or bars 38. It will be understood that any desired number of leaders may be engaged with a single pair of clamping members 43 so that as many hooks and leaders may be engaged with a single bar or bolt 38 and the associated clamping members 43 as the capacity of the clamping members 43 permits.

By providing opposed leader clamping members 43 on the supporting bar 28 and an individual hook holding bar or bolt 38 for each series of clamping members 43, a very large number of leadered hooks may be mounted interiorly of the reel. The number of leadered hooks which may be mounted in the snell formed by the bars 38 and the clamping members 43 is substantially equal to or greater than the normal number of hooks which are adapted to be used with a length of line wound upon the reel 26.

The bottom 11 of the casing is provided with pairs of upstanding dowels 49 which are spaced apart a distance substantially equal to the space between each of the side members 27 and the side members 27 are each provided on one edge thereof with a pair of sockets 50. The dowels 49 provide a means for holding the reel 26 in a fixed position relative to the case 10 and to the bottom 11, while at the same time, permitting the readily removal or replacement of the reel 26 in the reel compartment 25.

In the use of this equipment or kit the reel 26 may be normally positioned in the reel compartment 25 with the reel 26 engaged with the upstanding dowels 49. These dowels 49 will hold the reel against movement in the compartment 25. When it is desired to lay out the fish line L, the hooks 39 with the leaders 40 may be pulled off of the snell by first releasing the leaders 40 from the yieldable and side abutting clamping members 43.

The rings 41 carried by each leader 40 may then be snapped onto the hooks 42. By providing a combined reel and snell an exceedingly compact device has been provided which will make it unnecessary for the fisherman to have a separate reel and separate snell, or in the absence of any snells to have means for holding the leadered hooks. Where snells are not used, it is obvious that hooks with leaders thereon become snagged or tangled with the various leaders whereas with the use of a snell, the leader is kept taut at all times and this tight holding of the leader also facilitates the drying of the leader.

What I claim is:

1. A fishing kit comprising a receptacle, pairs of dowel members mounted interiorly of said receptacle, a line reel engageable in said receptacle and provided with pairs of sockets to removably receive said dowels for holding said reel against movement relative to said receptacle, said reel including line holding means, and a snelling means carried by said reel inwardly of said line holding means.

2. An improved line holding reel and snelling means comprising a pair of parallel frame members, a pair of parallel connecting members connecting said frame members together, a plurality of elongated frame holding bolts extending between said frame members and disposed in parallel relation to said connecting members, and a plurality of side abutting pegs carried by one of said connecting members, at least one of said bolts comprising a hook engaging member coacting with said pegs for holding leadered hooks in parallel relation to said frame members.

3. An improved line holding reel and snelling means comprising a pair of parallel frame members, a pair of spaced apart parallel line holding members fixed to and projecting outwardly and longitudinally of each end of each frame member, a pair of U-shaped line holding members secured one to each frame member between the ends thereof, a pair of parallel connecting members connecting said frame members together, a plurality of elongated frame holding bolts extending between said frame members and disposed in parallel relation to said connecting members, and a plurality of side abutting pegs carried by one of said connecting members, at least one of said bolts comprising a hook engaging member coacting with said pegs for holding leadered hooks in parallel relation to said frame members.

4. A snelling means comprising a rectangular frame including a pair of side members, a pair of transversely extending members, and a plurality of elongated bolts extending between said side members, and a plurality of resilient side abutting pegs carried by one of said transverse members.

TED M. PARKER.